US009754625B2

(12) United States Patent
Lau et al.

(10) Patent No.: US 9,754,625 B2
(45) Date of Patent: Sep. 5, 2017

(54) GENERATION AND USE OF USER-SELECTED SCENES PLAYLIST FROM DISTRIBUTED DIGITAL CONTENT

(75) Inventors: Kim Lau, Temple City, CA (US); Jacob Frautschi, San Francisco, CA (US); Massimiliano Gasparri, Los Angeles, CA (US); Randy Lee, La Crescenta, CA (US); Patrick Harman, Moorpark, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 888 days.

(21) Appl. No.: 12/533,970

(22) Filed: Jul. 31, 2009

(65) Prior Publication Data

US 2010/0110200 A1   May 6, 2010

Related U.S. Application Data

(60) Provisional application No. 61/085,351, filed on Jul. 31, 2008.

(51) Int. Cl.
| | |
|---|---|
| *G11B 27/034* | (2006.01) |
| *G11B 27/11* | (2006.01) |
| *H04N 21/2743* | (2011.01) |
| *H04N 21/426* | (2011.01) |
| *H04N 21/432* | (2011.01) |
| *H04N 21/442* | (2011.01) |
| *H04N 21/482* | (2011.01) |
| *H04N 21/845* | (2011.01) |

(52) U.S. Cl.
CPC ............ *G11B 27/034* (2013.01); *G11B 27/11* (2013.01); *H04N 21/2743* (2013.01); *H04N 21/42646* (2013.01); *H04N 21/4325* (2013.01); *H04N 21/44222* (2013.01); *H04N 21/4825* (2013.01); *H04N 21/8456* (2013.01); *G11B 2220/2541* (2013.01)

(58) Field of Classification Search
CPC ....... G11B 27/034; G11B 27/34; G11B 27/10; G11B 20/00086; G11B 20/00869; H04N 5/765; H04N 21/4825
USPC .................................................. 386/239–242
See application file for complete search history.

(56) References Cited

U.S. PATENT DOCUMENTS 5,237,648 A  *   8/1993  Mills et al. .................... 715/723
2002/0174430 A1 * 11/2002  Ellis ...................... G11B 27/005
725/46

(Continued)

*Primary Examiner* — Gelek W Topgyal
(74) *Attorney, Agent, or Firm* — Jonathan Jaech; Snell & Wilmer L.L.P.

(57) ABSTRACT

Digital content encoded on a physical media, such as a DVD or Blu-Ray disk, includes first content comprising a video feature such as a motion picture or the like, and a user-selectable application configured to operate as follows. When activated using an icon off of a menu screen, the application records an identifier for scenes (discrete portions) of the first content that are selected by a user to generate a playlist. The user may select the scenes by indicating a start and end of each scene. The application saves the playlist locally, then uploads to a server. Via a user account at the server, a user may publish the playlist to a user-created distribution list, webpage, or other electronic publication, and modify the playlist by deleting or reordering scenes.

26 Claims, 2 Drawing Sheets

(56) References Cited

U.S. PATENT DOCUMENTS

| | | | |
|---|---|---|---|
| 2003/0126599 A1* | 7/2003 | Novak | G11B 27/105 725/32 |
| 2005/0210507 A1* | 9/2005 | Hawkins | G06F 17/30035 725/46 |
| 2006/0008256 A1* | 1/2006 | Khedouri et al. | 386/124 |
| 2006/0140091 A1* | 6/2006 | Iwamoto et al. | 369/53.2 |
| 2006/0156354 A1* | 7/2006 | Jung et al. | 725/86 |
| 2006/0280437 A1* | 12/2006 | Logan et al. | 386/94 |
| 2006/0294201 A1* | 12/2006 | Kito et al. | 709/217 |
| 2007/0073725 A1* | 3/2007 | Klein et al. | 707/10 |
| 2007/0133944 A1* | 6/2007 | Takashima et al. | 386/94 |
| 2007/0162817 A1* | 7/2007 | Hamada | 714/755 |
| 2007/0174639 A1* | 7/2007 | Reckless | G11B 27/11 713/193 |
| 2008/0060084 A1* | 3/2008 | Gappa | G09B 5/00 726/28 |
| 2008/0189272 A1* | 8/2008 | Powers et al. | 707/5 |
| 2008/0288890 A1* | 11/2008 | Anderson et al. | 715/810 |
| 2009/0208189 A1* | 8/2009 | Sasaki et al. | 386/125 |
| 2010/0186038 A1* | 7/2010 | Thomas et al. | 725/42 |
| 2011/0314379 A1* | 12/2011 | Ubillos | 715/721 |

* cited by examiner

GENERATION AND USE OF USER-SELECTED SCENES PLAYLIST FROM DISTRIBUTED DIGITAL CONTENT

CROSS-REFERENCE TO RELATED APPLICATION

This application claims priority pursuant to 35 U.S.C. §119(e) to U.S. provisional application Ser. No. 61/085,351, filed Jul. 31, 2008, which is hereby incorporated by reference, in its entirety.

BACKGROUND

1. Field

The present disclosure relates to a system and method for enhancing user interface features associated with distributed digital content.

2. Description of the Related Art

Motion picture feature films and similar audio-visual digital content is often distributed as a package of digital content formatted for play by a specialized player according to a specific standard. For example, movies, television episodes, and similar content are often encoded as digital data on optical media such as HD DVD or Blu-ray discs, and distributed in distributed in packages of one or more discs. Each digital content package may consist of a specific set of binary files formatted according to an applicable audio or video codec, representing various parts of an interlinked media presentation when played by the appropriate media player. For example, one file may be played to present a feature film, while other files are played to present various menus and special features on a consumer display device, such as a video monitor. All of the files are characteristically configured to be playable using a media player compliant with a specific standard, which specifies various video or audio codecs, for example, MPEG-2, MPEG-4 AVC, SMTPE-VC1, Linear PCM, and Dolby Digital. Supported codecs require limitations on the digital content that is to be played, and data or executable files that do not comply with a supported codec cannot generally be played using a standard media player. The HD DVD standard is no longer supported, and applications written for HD DVD may need to be migrated to Blu-ray for future distribution. Information concerning the HD DVD standard is available from the DVD Forum at www.dvdforum.org. Information concerning the Blu-ray standard is available from the Blu-Ray Disc Association at www.blu-raydisc.com. Unlike the DVD standard, the HD DVD and Blu-ray standard include built-in support for network connectivity.

Digital content packages formatted to specific Blu-ray or equivalent standards are usually provided on a physical media, such as an optical disc. These standards were specifically developed for optical media, and are designed to provide a specified data density for media compliant with the applicable standard, among other things. Digital files encoded on media compliant with these standards, in turn, must comply with published video or audio codecs specified by the applicable standard. While physical media is usually employed, a digital content package consisting of files that comply with all requirements of a particular standard need not be encoded on an optical disc. Such a digital content package may be streamed via a wide area network, wirelessly broadcast, and/or stored on a variety of different computer memories, while retaining all the characteristics of a compliant content package, including consistent adherence to specific audio-video codecs for encoding of audio-video data, and strict avoidance of executable or other data not compliant with the applicable standard. Such characteristics make the compliant digital content package suitable for use by any compliant media player to provide audio-video output.

The personal home viewing of a motion picture or other thematically coherent audio-video work is, for some users, not merely a passive entertainment experience. Some users desire to interact with the audio-video work in more critical and creative ways to produce derivative works that, while limited in scope, reflect their own personal tastes and creative abilities. For example, this phenomenon can be seen at work at Internet sites such as hosted by YouTube and others, wherein users borrow freely from copyrighted content in audio-video works to create and publish new but derivative audio-video works. Presently distributed digital content packages do not provide tools for allowing any type of derivative work creation within the scope of an accompanying license. As a result, many if not most amateur derivative works based on published digital content packages for audio-video works are produced using inconvenient external computer and editing tools in violation of license terms, are often of poor quality, and may sometimes be harmful to the interests of the copyright holder. It would be desirable, therefore, to provide systems and methods that enable creation and publication of derivative works based on published audio-video works while avoiding the problems and limitations of the prior art.

SUMMARY

The present technology provides an application and method whereby an end user may prepare and publish an amateur derivative work of controlled scope and quality from an audio-video work published as a fixed digital content package, without requiring additional editing tools and software beyond what is provided embedded in the digital content package itself. For example, a consumer of a Blu-ray disc may need nothing more than the disc and a standard Blu-ray player with remote control to produce a derivative work made of selected scenes (or "playlist") from a motion picture or other audio-video content encoded on the disc. To publish the derivative work, the user need only provide an Internet connection for the media player, through which the playlist may be uploaded to a system server. Once the playlist is located at the system server, the user may log into a service interface of the server to view the playlist, edit the playlist if desired, and publish the playlist to a selected forum or distribution list. Meanwhile, the system server may track and control playlist distribution and the scope of allowed edits to ensure compliance with applicable terms of the underlying content's copyright, if any.

Further details and features of the present technology are described in the detailed description that follows.

DESCRIPTION OF DRAWINGS

In the figures and in the detailed description, like element numerals are used to indicate like elements appearing in the figures.

DETAILED DESCRIPTION

Figure 1:
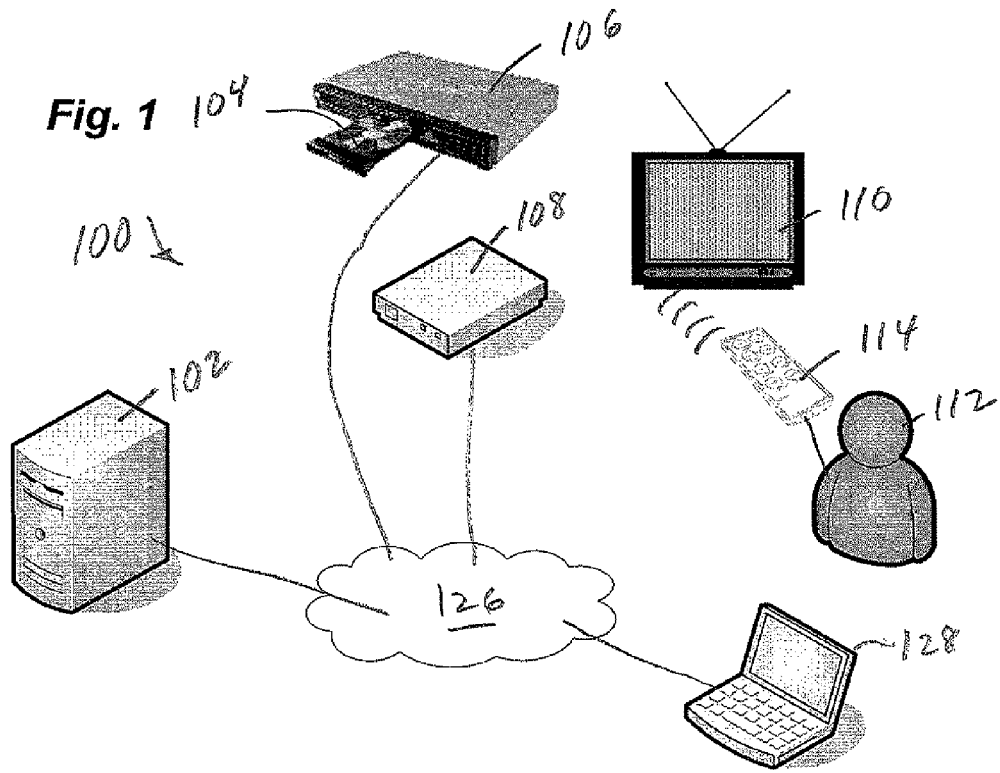
FIG. 1 is a system diagram showing various exemplary elements of a system 100 in which methods described herein may be performed, or applications as described herein may operate.

Referring to FIG. 1, system 100 may comprise a remote playlist server 102 hosting a user interface for playlist management and a database of user-provided playlists provided via a playlist-generating application included in an original digital content package. The original digital content package may be encoded on a specific media according to an applicable standard for digital audio-video data, for example, on an optical disc media 104 for play in a compatible media player 106 located remotely from the server 102 to provide audio-video output. As mentioned already, suitable standards may include, for example, HD DVD, Blu-ray, or proprietary digital set-top box protocols. In the alternative, or in addition, the original digital content may be encoded in some other medium or device, such as magnetic media or a flash memory device, accessible to player 106. Yet another alternative is to broadcast or stream the original digital content package from a network source (not shown) to a remotely located set-top box 108, which may cache the original digital content package on a local storage medium or memory device for local playback.

Either or both of the media player 106 or set-top box 108 may be connected via a wired or wireless connection to an audio-video output system 110, for example, a television monitor with integrated audio amplifier and speakers. The audio-video output system 110 may be viewed by a user 112. Using a remote control 114 or other suitable user input device, the user may provide control feedback to a relevant one of the media player 106 or set-top box 108, controlling play of the audio-video content encoded in the original digital content package. Similarly, a user 112 may provide input to a playlist application included in the original content, to be described further herein, for authoring, viewing, and editing a playlist based on the original content, and optionally, uploading the playlist to a network site for further operations.

Server 102 may be in electronic communication with player 106 or set-top box 108 via WAN 126. In the alternative, or in addition, the player 106 or set-top box 108 may communicate with server 102 through a dial-up telephone line, cable network, satellite network, or other communications network. Generally, one playlist server may be in communication with a large plurality of first content players 106, 108 for different users and any number of ancillary devices 128 for receiving playlists and other data from the players or set-top boxes.

Figure 2:
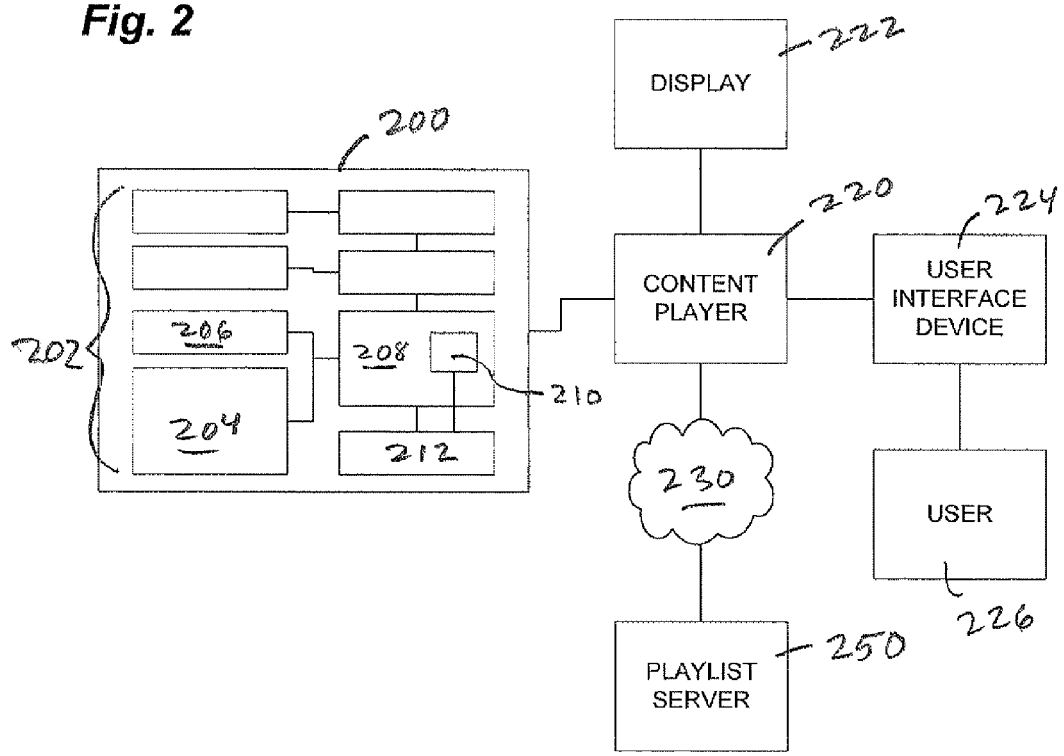
FIG. 2 is a block diagram showing an exemplary content package in more detail, in combination with selected system elements that interact with the content package to provide scene selection and use features.

Within an exemplary system 100, an original content package 200 as shown in FIG. 2 may be produced and delivered to a media player for an applicable audio-video standard. As permitted by the HD DVD and Blu-ray standards, the content package may comprise a plurality of interlinked files 202, for example a main audio/video program file 204 and root menu file 206. These files may also include a special features file 210 having a link to a special application 212 for authoring and managing a playlist.

Special application 212 may be coded in an application compatible with the applicable media player. For example, for use with a Blu-ray player, application 212 may be coded in Java ME. Digital set-top boxes may also be programmed to provide the network connectivity and interactive features as described herein, and may be coupled with Digital Video Recording (DVR) capability for storing first content packages transmitted to the set-top box from a computer network, cable network, or digital broadcast source.

Original content 200 when played on content player 220 may cause a menu to appear on display 222. The displayed menu may include one or more links 210 inviting the user to create a playlist, view a saved playlist, edit a playlist, or upload a playlist to a network site. For example, the displayed menu may invite the user to begin creation of a new playlist. The user 226 may select the link via a user interface device 224 in communication with player 220, for example, a Blu-ray remote control device with directional keys and an "enter" or "select" button. When the link is thus selected using the interface device, application 212 may operate in response to selection of the link, causing a second interface screen displaying instructions for creating a playlist to appear, with a second link for initiating creation of a playlist. In addition, the application may cause a screen or link to a screen to appear, inviting the user to name the playlist to be created by selecting alpha-numeric characters from on-screen menu. In the alternative, or in addition, the application may automatically assign a name to the new playlist based on a predetermined naming convention.

The application may be configured to receive playlist data after receiving input for initiating creation of a playlist. Although playlist data may take various forms, in one useful embodiment, the playlist consists essentially of a sequence of time values corresponding to a timeline for the sampled content, together with an identifier for the sampled content and optionally, metadata such as, for example, a playlist author and/or device identifier, date/time of creation, dates/times of edits, and time required to play the entire sequence of cuts represented by the playlist. Each time value in the list indicates alternating "start" and "stop" values for a continuous audio-video segment of the original content. Application 212 may be configured to enable a user to select these time values making up the playlist using a suitable interface operating on the media player 220.

Figure 3:
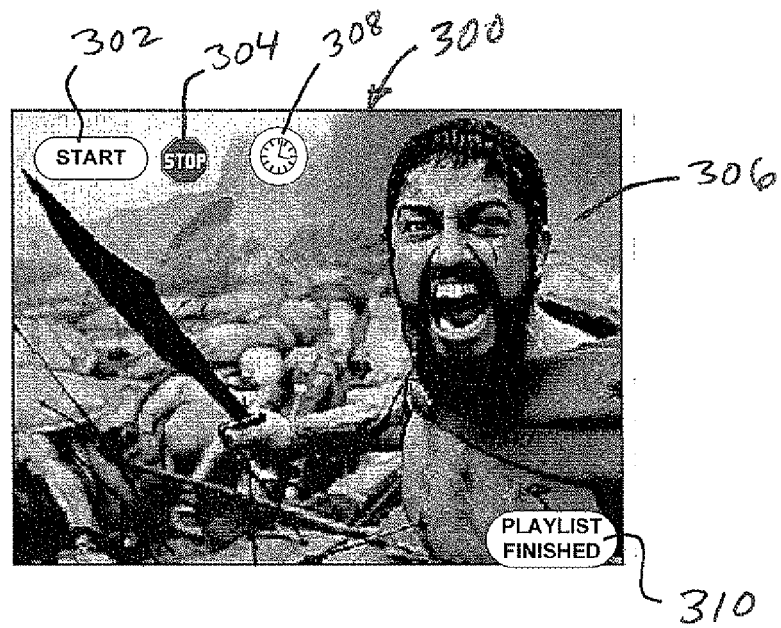
FIG. 3 is a screenshot showing exemplary interactive features for controlling generation of a playlist in response to user input.

One suitable interface for selecting time values may include a "start" icon 302 and "stop" icon 304 that are displayed on the screen 300 overlaying the original video content 306, optionally with a status indicator icon 308, as shown in FIG. 3. Each icon may be configured to interact with user input from a remote control or similar input device, using methods as known in the art. For example, in response to directional input from a remote control device, the application 212 may toggle a highlight between the "start" icon 302 and "stop" icon 304. In response to selection input from the remote control, the application may record the current timeline value of the original content when the start icon is selected, as a start time value. Conversely, the application may record the current timeline value in response to selection of the "stop" icon, as a stop time value. In the alternative, a single "start/stop" icon may be used for selecting both start times and stop times, in alternating sequence. Whatever the arrangement of icons, the application may display a status indicator icon 308, which may pulse, blink, indicate the passage of time, or be otherwise animated, to alert the viewer that a "start" command has been activated until a subsequent "stop" selection is received. When a "stop" command has been received by the player, causing the application to record a stop time value, the application may cause the status icon to disappear or change in appearance, to indicate to the viewer that the concurrent video portion is not being selected for inclusion in the playlist. During operation of the application 212 to record user input defining a playlist, regular navigation controls for the original content may be configured to operate normally. Thus, for example, a user may be able to "reverse," "fast forward," "skip" forwards or backwards, "pause," "resume" or execute other navigation commands, at least at times when the original video is not being selected for inclusion in the playlist. At times when user input has caused the application to select the original video for inclusion in the playlist, it may be desirable (but not required) to disable some or all navigation functions, to prevent inordinately long or backwards-running scenes from being selected for inclusion in the playlist. When scene selection is complete, the application may receive input, for example selection of a "playlist finished" icon 310, indicating no more start/stop values are to be added to the playlist. In response to such input indicating the playlist is finished, application may store the finished playlist in an available memory of player 220.

In the alternative, or in addition, other interfaces may be presented to the viewer to facilitate playlist selection. For example, the application 212 may present a timeline of the original content in one or more screens, with or without thumbnail images relating to the original content at corresponding locations along the timeline. The timeline may be formatted to permit the user to highlight and select portions of the timeline for inclusion in the playlist. However, this approach suffers from the disadvantage of requiring a specialized interface for scene selection. In contrast, the use of interactive selection icons as previously described requires relatively little programming overhead and bandwidth.

Whatever selection interface is used, the selection process as implemented by application 212 may result in a completed playlist in an available memory of player 220. Application 212 or another application included in the original content package may output a menu interface for viewing, editing, deleting, and uploading one or more stored playlists. Application 212 or a cooperating application may be configured to retrieve stored playlists from available memory and present a command interface via the player display, in response to user selection of the application from a special features menu of the original content package. In response to additional user inputs received through a player interface device, the application may allow the user to add or delete scenes from a particular playlist, change the length of an existing scene in a playlist, or select and attach a soundtrack to replace or supplement the sound accompanying each scene in the original content from which the scene is selected. Other editing features may also be provided, such as enabling addition of a voice-over soundtrack via microphone input, addition of user-selected icons, graphics, or clip art in an overlay, or outside of the frame of the video, or addition of textual subtitles or commentary in as an overlay, outside of the frame, or in a speech bubble graphic. While there may be no limit in theory to the number and complexity of editing functions that may be provided, in practice, cost and bandwidth limitations, as well as inherent limitations of the user interface for the player and player memory, may limit or prevent the installation of an editing capability on the player platform. In the alternative, or in addition, editing functionality may be provided at a remote network playlist server 250 to which the playlist may be uploaded via the player's network connection.

Accordingly, the application 212 may be configured with an upload command on a menu screen, in association with one or more stored playlists. In response to receiving user input indicating selection of an upload command for a designated one or more playlists, the application may transmit the designated one or more playlists to a designated network playlist server 250. Network playlist server 250 may be a predetermined site accessed via a network address coded into the original content package or via a later-determined address pushed or pulled to the player device in response to generation of a playlist or other trigger. In the alternative, or in addition, application 212 may receive input via the user input device specifying an address to which the playlist may be uploaded. However, for most implementations, user determination of the upload address may neither be practical nor desirable. Use of a system-determined address may prevent communication problems arising from uploading a file to an incompatible address, as well as preventing uncontrolled use of the playlist.

As described herein, a playlist consisting essentially of a sequence of start and stop values and related metadata should be of little interest or value unless coupled to the original content to which the playlist relates. By the same token, playlists may be configured such that little or no threat of copyright infringement is created by free distribution of the playlist. For example, playlists may be configured such that they can be used to generate a viewable video clip only by a device possessing an authorized copy of the original content from which the playlist was generated, capable of generating a video clip using the playlist and the original content as inputs. Such a playlist may contain no copyrighted content, and may consist instead only of the numeric playlist values, administrative metadata, and user-supplied content (for example, voiceover audio files), if any.

Therefore, a network playlist server 250 to which playlists may be uploaded may be provided with a copy of the original content and may be configured to permit generation and viewing of the video clips by users that do not possess original copies of the underlying content from which the playlist was generated, subject to restrictions as desired by the copyright holder. For example, the network site may enforce a restriction that no playlist have a total play time longer than a specified percentage of the feature content length or longer than a fixed maximum time; a restriction that certain defined scenes or portions of scenes cannot be included in a published video clip; a restriction requiring video clips to be generated at a screen resolution less than a defined maximum; or any combination of these or other restrictions. In the alternative, or in addition, uploaded playlists may be manually reviewed to ensure that the video clips generated thereby do not contain offensive, derogatory, or other user-supplied content that does not comply with a defined standard, before being approved for publication or distribution.

Subject to such restrictions and review, video clips generated from uploaded playlists may be viewed by any user visiting the site. Optionally, the site may require visitors to establish an account and log in before providing access to video clips or other content. One of the benefits of maintaining such a site, beside attracting traffic from content consumers to advertise or sell related content items, may be to gather information concerning which scenes of a motion picture or other entertainment feature are of the greatest interest to viewers. Therefore, the playlist server 250 may maintain statistics concerning video clip views, and analyze such viewing statistics in conjunction with playlist data to draw inferences concerning the popularity or attractiveness of various scenes. Such analysis may be useful for developing promotional materials or future content. Consent for publication and other use of the uploaded playlist may be obtained from each user prior to uploading the playlist to the network site, for example via a shrink wrap license of the original content package, a click-through license at the time of uploading the playlist, or both.

While providing access to video clips at the playlist server 250 itself is undoubtedly of value, it may also be desirable to export video clips for use by consumers on other media devices, including but not limited to personal computers, thin clients, mobile telephones, personal digital assistants, compact media players, and so forth, on which no authorized copy of the original content resides. Therefore, in response to user input received at the network site, appropriately formatted media files compliant with applicable content restrictions may be automatically generated by the site, in response to user input. For example, the site may serve a web page permitting each user to select their own or other users' stored playlists for exporting to an alternative platform. In response to a user request received through such a page, the site may generate a video clip using the playlist and original content, which may be viewed on other platforms not possessing an authorized copy of the original content. Likewise, the site may distribute such exportable video clips to remote addresses as indicated via user input.

Similarly, the playlist server 250 may be configured to provide users with more complex and capable tools for editing playlists and supplementing them with user-provided content than may readily be provided at the media player level. Possible editing functions may include those functions already mentioned, and various other functions limited only by the imagination of the site designer and desired restrictions on the scope or content of derivative works that may be produced using the site.

Optionally, the playlist server may maintain separate accounts for each user that uploads a playlist via a content player playing original digital content packages. Such accounts may be accessed via a web interface in a conventional fashion. The web interface may be configured to allows users to view, edit and delete uploaded playlists, publish playlists to selected on-line forums or distribution lists, view account records of past activity, pay account balances, indicate addresses for destination devices to receive exported video clips, obtain and manage customer loyalty points, and generally provide electronic commerce services associated with the original digital content and uploaded playlists.

Figure 4:
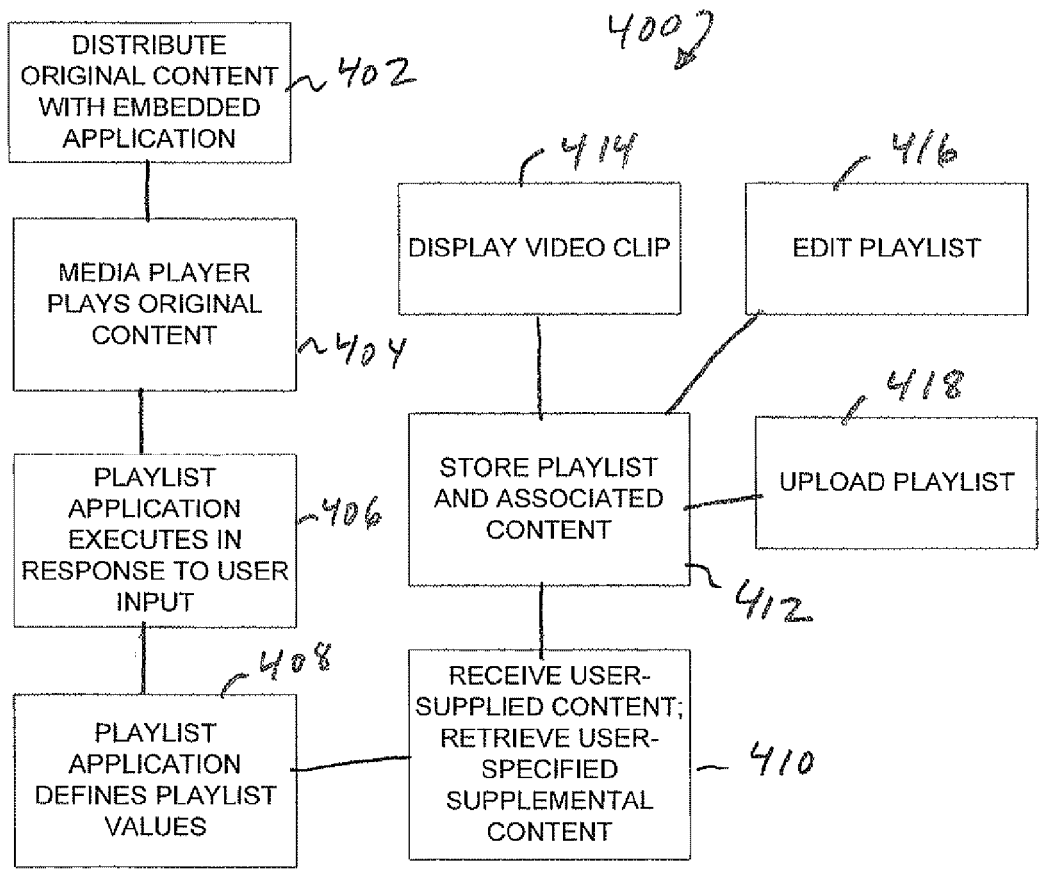
FIG. 4 is a flow chart showing exemplary steps of a method for generation and use of a user-selected scenes playlist from a content package configured for play on a media player.

In accordance with the foregoing, FIG. 4 shows exemplary steps of a computer-implemented method 400 such as may be implemented by a playlist application operating on a media player of the foregoing systems, in cooperation with other system elements as already described. Steps of method 400 and related actions may be implemented in a processor of the media player by coding appropriate instructions in a computer language in an application embedded in original digital content distributed to the player device. Resulting executable code comprising one or more applications may be encoded on a computer-readable medium and used to cause the media player to perform the related steps and actions.

Prior to activity at the playlist server, a original digital content package with an embedded application may be distributed 402 to one or more specialized media players, for example, HD DVD or Blu-ray players, or to a digital set-top box. Production of the original digital content package and embedded application may be in accordance with the foregoing disclosure, and the application should be configured to operate on the intended media player in the manner described herein. The original digital content may be distributed on physical media such as optical disks, or transmitted for storage or caching on a local memory device accessible by the media player device.

At 404, the media player may be operated with a connection to a WAN or other communication network, configured to upload user-generated playlists to a remote site in response to user input received at the media player, to play the original content package. In response to user selection of a special features command, an application for generating a playlist may be executed 406 from the original content. The application may operate as previously described in more detail to define user-selected time values 408 in response to user input to the player device, wherein the user selected time values define a sequence of scenes or clips taken from the original content, as measured against an original content timeline. Optionally, in response to user input the application may receive user-supplied digital content or supplemental content 410 included in the original content or player memory, and associate the user supplied content and/or supplemental content with a timeline for the playlist. At 412, the application may store a defined playlist and any user-supplied content or supplemental content, if any, in an available memory of the media player.

Various optional operations may be performed by the application on the stored playlist. For example, the application may, in response to user input, display a video clip 414 generated from the playlist, original content, and user-supplied or supplemental content. In addition, or in the alternative, the application may edit a stored playlist 416, in response to user input, as previously described. Still further, the application may upload a stored playlist and associated metadata or content data 418, if any, to a designated network site, again in response to user input. The application may configure the uploaded playlist such that it cannot be used to generate a video clip unless on a device that includes a copy of the original content from which the playlist was generated. For example, the uploaded playlist file may lack any portion of the original content data.

Having thus described a preferred embodiment of a system and method for enabling generation and use of a user-selected playlist using original entertainment content operating on a specialized media player, it should be apparent to those skilled in the art that certain advantages of the within system have been achieved. It should also be appreciated that various modifications, adaptations, and alternative embodiments thereof may be made without departing from the scope and spirit of the present technology. For example, a playlist application embedded in a HD DVD or Blu-ray disc has been described, but it should be apparent that the novel concepts described above may be applied by one of ordinary skill to other forms of first digital content packages to thereby realize the benefits described herein.

What is claimed is:

1. A method comprising:
   reading a portable disc medium encoded with at least one digital audio-video content file and with an embedded application for generation of a playlist, using a media player device configured for playing the portable disc medium to provide video output;
   playing the portable disc medium by the media player device in response to insertion of the disc medium into the media player device, thereby causing a menu display including a link to the embedded application to automatically appear on a display device;

receiving menu selection input via a user interface indicating selection of the link to the embedded application from the menu display;

executing the application read from the portable disc medium using a processor of the media player device in response to the menu selection input, thereby enabling generation of a playlist comprising a list of time values from a timeline of the at least one digital audio-video content file, the playlist indicating a sequence of sampled clips from the at least one digital audio-video content file, in response to input from a user input device in communication with the media player device, the application further enabling selection of the time values by user selection of at least one interactive icon displayed concurrently with and overlying video output from the at least one digital audio-video content file, wherein the application records a start one of the time values in response to user selection of a start one of the at least one interactive icon and records a stop one of the time values in response to user selection of a stop one of the at least one interactive icon; and uploading the playlist with an identifier for the at least one digital audio-video content file to a server configured to permit generation of video clips including a portion of the audio-video content by users that do not possess an original copy of the audio-video content, subject to specified copyright restrictions on content of the video clips and subject to a restriction that total play time of the playlist is not longer than at least one of a specified percentage of the digital audio-video content file or a fixed maximum time.

2. The method of claim 1, further comprising executing the application using a processor of the media player device to enable selection of the time values while playing the at least one digital audio-video content file using the media player device.

3. The method of claim 1, further comprising transmitting the playlist with an identifier for the at least one digital audio-video content from the media player device to a remote server, in association with a user account identifier.

4. The method of claim 1, further comprising generating the sequence of sampled clips to prepare a second audio-video content file distinct from the at least one digital audio-video content file.

5. The method of claim 4, further comprising transmitting the second audio-video content file to a remote server, in association with a user account identifier.

6. The method of claim 1, further comprising executing the application using a processor of the media player device to enable input of audio or video content that is not included in the at least one digital audio-video content file to the media player device, correlated to the playlist.

7. The method of claim 6, further comprising capturing the audio or video content that is not included in the at least one digital audio-video content file using an apparatus selected from a microphone or video camera in communication with the media player device.

8. The method of claim 6, further comprising capturing the audio or video content that is not included in the at least one digital audio-video content file as text selected in response to input from the user input device.

9. The method of claim 1, wherein the media player device is a Blu-ray player.

10. A method comprising:

receiving, using at least one server, a playlist and an identifier for an audio-video data file on a portable disc medium played by a remote player device, wherein the playlist comprises a list of time values from a timeline of the audio-video data file indicating a sequence of sampled clips from the audio-video data file selected at the remote player device in response to input from an input device;

configuring the playlist so that the sequence of sampled clips can only be generated by a receiving node that is accessing an entire authorized copy of the audio-video data file from which the playlist was generated;

serving the playlist and the identifier to a client node without data from the audio-video data file;

generating a second audio-video data file using the at least one server, including content from the audio-video data file selected and arranged according to the playlist; and enabling, by the server, users that do not possess an original copy of the audio-video content to generate video clips including a portion of the audio-video content, subject to specified copyright restrictions on content of the video clips and subject to a restriction that total play time of the playlist is not longer than at least one of a specified percentage of the digital audio-video content file or a fixed maximum time.

11. The method of claim 10, further comprising processing the playlist using the at least one server to determine whether the playlist complies with requirements defined for works generated from the audio-video data file.

12. The method of claim 10, further comprising serving an interface from the at least one server enabling uploading of additional audio or video data to the at least one server, and storing the additional audio or video data in association with the playlist.

13. The method of claim 12, further comprising serving the playlist and the additional audio or video data to a client for use in generating second audio-video data including content from the audio-video data file and the additional audio or video data.

14. The method of claim 10, further comprising receiving additional audio or video data at the at least one server, and incorporating the additional audio or video data in the second audio-video data file.

15. The method of claim 10, further comprising processing the second audio-video data file using the at least one server to determine whether the second audio-video data file complies with requirements defined for works incorporating content from the audio-video data file.

16. A non-transitory computer-readable optical disc medium encoded with an audio-video data file and with an embedded application for generation of a playlist, wherein the disc medium is configured to automatically cause, in response to insertion of the disc medium into the media player device, display of a menu including at least one link inviting a user to create a playlist and the embedded application is configured, when executed in response to user selection of the link by a media player capable of producing an audio-video output signal from the audio-video data file, to cause the media player to generate a playlist comprising a list of time values from a timeline of the audio-video data file by user selection of at least one icon displayed concurrently with playing the audio-video data file overlying a display output of the audio-video data wherein the embedded application records a start one of the time values in response to user selection of a start one of the at least one icon and records a stop one of the time values in response to user selection of a stop one of the at least one icon, the playlist indicating a sequence of sampled clips from the audio-video data file subject to a restriction that total play time of the playlist is not longer than at least one of a specified percentage of the digital audio-video content file or a fixed maximum time, in response to input from a user input device in communication with the media player device, and to upload the playlist with an identifier for the audio-video data file to a server configured to permit generation of video clips including a portion of the audio-video content by users that do not possess an original copy of the audio-video content, subject to specified copyright restrictions on content of the video clips.

17. The non-transitory computer-readable optical disc medium of claim 16, wherein the embedded application is further configured, when executed by the media player, to cause the media player to enable selection of the time values while playing the audio-video data file.

18. The non-transitory computer-readable optical disc medium of claim 16, wherein the embedded application is further configured, when executed by the media player, to cause the media player to generate the sequence of sampled clips to prepare a second audio-video data file distinct from the audio-video data file.

19. The non-transitory computer-readable optical disc medium of claim 16, wherein the embedded application is further configured, when executed by the media player, to cause the media player to enable input of audio or video content that is not included in the audio-video data file to the media player, correlated to the playlist.

20. The non-transitory computer-readable optical disc medium of claim 16, wherein the embedded application and the audio-video data file are further configured as Blu-ray data for use by the media player.

21. A system comprising:
at least one server configured to store a playlist and an identifier for an audio-video data file a remote player device during play of an audio-video data file, wherein the playlist comprises a list of time values from a timeline of the audio-video data file indicating a sequence of sampled clips from the audio-video data file selected at the remote player device in response to input from an input device subject to a restriction that total play time of the playlist is not longer than at least one of a specified percentage of the digital audio-video content file or a fixed maximum time, and the server is configured to:

publish the playlist and the identifier over a computer network for use in playing the sequence of sampled clips;

configure the playlist so that the sequence of sampled clips can only be generated by a receiving node that is accessing an entire authorized copy of the audio-video data file from which the playlist was generated as an input for generating the sequence;

serve the playlist and the identifier to a client node without data from the audio-video data file;

serve an interface enabling uploading of additional audio or video data to the at least one server, and store the additional audio or video data in association with the playlist; and enabling, by the server, users that do not possess an original copy of the audio-video content to generate video clips including a portion of the audio-video content, subject to specified copyright restrictions on content of the video clips.

22. The system of claim 21, wherein the at least one server is further configured to process the playlist to determine whether the playlist complies with requirements defined for works generated from the audio-video data file.

23. The system of claim 21, wherein the at least one server is further configured to serve the playlist and the additional audio or video data to a client for use in generating second audio-video data integrating content from the audio-video data file and the additional audio or video data.

24. The system of claim 21, wherein the at least one server is further configured to generate a second audio-video data file, including content from the audio-video data file selected and arranged according to the playlist.

25. The system of claim 24, wherein the at least one server is further configured to receive additional audio or video data, and to incorporate the additional audio or video data in the second audio-video data file.

26. The system of claim 25, wherein the at least one server is further configured for processing the second audio-video data file to determine whether the second audio-video data file complies with requirements defined for works incorporating content from the audio-video data file.

* * * * *